W. MILLEN.
AUTOMOBILE WHEEL.
APPLICATION FILED JULY 5, 1917.

1,262,372.

Patented Apr. 9, 1918.
2 SHEETS—SHEET 1.

WITNESS:
John Pohland

INVENTOR.
Webster Miller
BY

ATTORNEY.

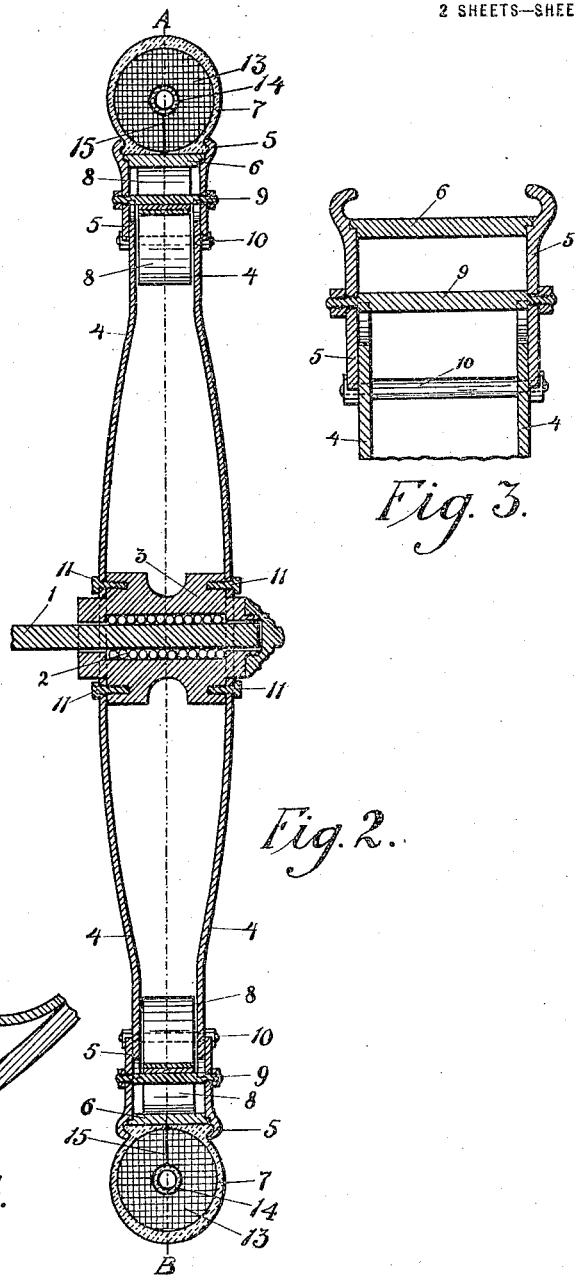

UNITED STATES PATENT OFFICE.

WEBSTER MILLEN, OF RENO, NEVADA, ASSIGNOR OF ONE-THIRD TO ARTHUR MILLEN AND ONE-THIRD TO WILLIAM L. HUBNER, BOTH OF RENO, NEVADA.

AUTOMOBILE-WHEEL.

1,262,372.   Specification of Letters Patent.   Patented Apr. 9, 1918.

Application filed July 5, 1917. Serial No. 178,765.

*To all whom it may concern:*

Be it known that I, WEBSTER MILLEN, a citizen of the United States, residing in Reno, in the county of Washoe, State of Nevada, have invented new and useful Improvements in Automobile-Wheels, of which the following is a specification.

This invention relates to wheels and particularly pertains to wheels of the spring type in which a series of spring elements are interposed between a pair of spaced concentric wheel rims to afford a resilient mounting for the outer rim.

It is the object of this invention to provide a construction and arrangement of spring elements whereby an inner wheel member will be supported within an outer rim and suspended therein in such manner that the rim and wheel member will have resilient movement in relation to each other radially and circumferentially, and whereby the spring elements are held in place and secured without direct connection to permit their ready removal and replacement.

Another object is to provide a wheel embodying a pair of disks connected together and spaced apart by spacing bolts, and an outer rim having side plates separated by spacing bolts adapted to be disposed intermediate the bolts on the disks, in which the resilient connection between the disks and rim is effected by a series of springs of the plate type formed to seat on the spacing bolts and so engaged therewith as to be securely held in place.

Other objects will appear hereinafter.

The invention is illustrated in the accompanying drawings, in which:

Fig. 2 is a view in section as seen on the line 2—2 of Fig. 1.

Fig. 3 is a detail view showing the manner of mounting the outer rim on the wheel disks, with the springs removed.

Fig. 4 is a detail showing how the ends of the springs are seated on the wheel rim bolts.

Figure 1:
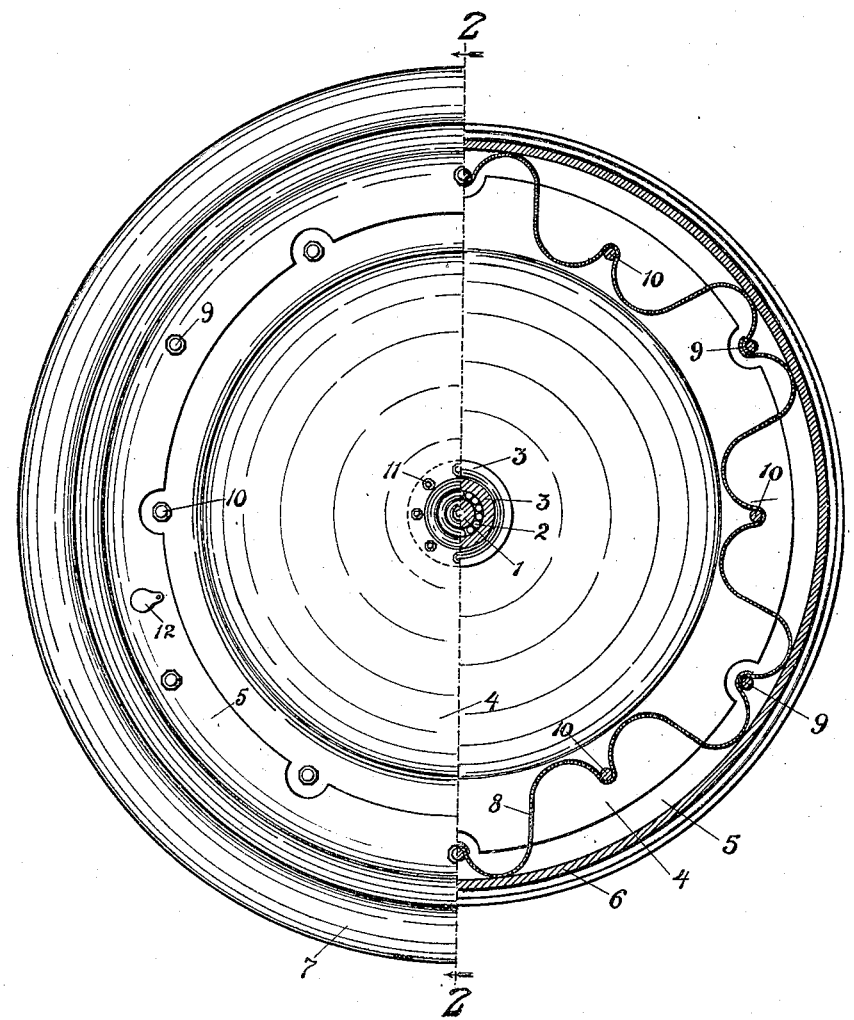
Figure 1 is a view of the wheel partly in elevation and partly in vertical section as seen on the line A—B of Fig. 2.

More specifically 1 indicates a wheel spindle, 2 ball-bearings thereon, and 3 a wheel hub supported on the bearings and spindle. A pair of corresponding sheet metal disks 4 are rigidly secured to the ends of the hub and are spaced apart at their outer edges. A pair of ring flanges 5 on the edges of a wheel rim 6 engage a cushion tire 7 supported on the rim, and overlap the edges of the disks in slidable engagement therewith. The essence of this invention resides in a series of springs 8 interposed between the wheel rim and disks and the manner of mounting same, as will presently appear. The ring flanges 5 of the wheel rim are spaced apart and also held in engagement with the wheel rim by spacing bolts 9 which are formed with reduced threaded ends inserted through perforations in the flanges and on which nuts are screwed to bind the flanges against shoulders at the base of the reduced end portions of the bolts. The bolts 9 are spaced from the inner face of the rim. The inner faces of the ring flanges are formed with shoulders in which the wheel rim seats and have curved flanges on their outer edges projecting beyond the outer face of the rim to engage the side flanges of the tire as is common in flanged rim construction. The outer edges of the disks are spaced apart and connected together by spacing bolts 10 corresponding to the bolts 9. The bolts 9 and 10 are so arranged in relation to each other that when the wheel disks and rim are placed in their proper relative positions the bolts 9 will lie on an annular line outside of the bolts 10, and will be disposed intermediate the latter.

The springs 8 are bent upon themselves intermediate their ends to form saddles adapted to seat on the bolts 10; the spring being curved downwardly, thence upwardly in U-shape, on opposite sides if the saddle with the outer limbs extending divergently and bent back in inverted U-shape thus forming oppositely inclined S-shaped spring members connected together at their inner ends. The outer ends of the spring members are bent back on half loops to form hooks adapted to engage the bolts 9; the hooks on the ends of adjacent spring members being adapted to nest one within the other. The outer curved portions of the springs are preferably arranged to lie in contact with the inner wall of the rim but obviously may be spaced therefrom.

The disks 4 are attached to the hub 3 by bolts 11 or other suitable fastenings.

Any suitable type of tire may be mounted on the wheel rim and in event the ordinary pneumatic tire is employed a covered opening 12 is provided in the flange 5 and the disk there-beneath. The tire here shown is of the cushion type which consists of the usual outer casing having a filler 13 therein. This filler is preferably formed of felt fitted with a rubber tube 14 at its center; the filler being split or divided at 15 on its inner periphery to permit the tube being placed therein.

In assembling the wheel one of the disks is fastened to the hub and the bolts 10 are set in place. The wheel rim and one of the flanges with the bolts 9 thereon is then disposed in position on the disk. The springs 8 may then be set in place whereupon the other disk is secured in position. The tire is then mounted on the wheel rim and the other rim flange secured in position. The operation of the invention is obvious.

While I have set forth a specific embodiment of my invention it is manifest that various changes may be made in details of construction without departing from the invention as set forth in the accompanying claims.

I claim:

1. In a wheel, an inner wheel member, a series of bolts carried thereby, an outer wheel member, a series of bolts thereon, and a series of spring members interposed between the adjacent bolts and seating thereon, said springs being bent to seat on the inner side of the bolts on the outer wheel member and to seat on the outer side of the bolts on the inner wheel member.

2. In a wheel, a hub, a pair of wheel disks thereon, spacing bolts connecting the outer edges of said disks and holding same in spaced relation, a wheel rim, a pair of flanges on said rim, spacing bolts connecting said flanges, and oppositely inclined spring members extending from the bolts on the disks to the bolts on the flanges, said springs seating on the outer side of the bolts on the disks and having their ends seating on the inner side of the bolts on the flanges.

3. In a wheel, an inner wheel member, a series of bolts carried thereby, an outer wheel member, bolts thereon, and a series of spring members bent to form oppositely inclined S-shaped portions connected by an inverted U-shaped saddle intermediate their ends, the saddle portion being set astride the bolts on the inner wheel member from the outer side thereof and seating at their ends on the inner side of the bolts carried by the outer wheel member.

4. In a wheel, a hub, a pair of wheel disks thereon, bolts connecting the outer edges of said disks and holding same in spaced relation, a wheel rim, a pair of demountable flanges on said rim, spacing bolts connecting said flanges and serving to hold same in spaced relation and springs seating between the bolts on the disks and flanges.

5. In a wheel, a spring bent upon itself intermediate its ends to form an inverted U-shaped saddle and bent downwardly and thence inclined upwardly on opposite sides of the saddle, the end portions of said spring being bent in inverted U-form, an inner wheel member, and an outer wheel member between which said springs are interposed.

6. In a wheel, an inner wheel member, spaced bolts on the rim thereof, an outer wheel member, spaced bolts thereon, and a series of springs having a portion seating astride the outer face of the bolts on the inner wheel member and a portion seating astride the bolts on the outer wheel member, said springs extending obliquely between the bolts and having U-shaped portions projecting beyond the bolts.

WEBSTER MILLEN.

Witnesses:
JOHN POHLAND,
CHARLES H. BURRITT.

Copies of this patent may be obtained for five cents each, by addressing the "Commissioner of Patents, Washington, D. C."